United States Patent

Illman et al.

[15] 3,648,529
[45] Mar. 14, 1972

[54] INTERMITTENT MOTION TRANSMISSION

[72] Inventors: Peter Illman; Arthur G. Roberts, both of Bognor Regis, England

[73] Assignee: P. R. Mallory & Co. Inc., Indianapolis, Ind.

[22] Filed: Jan. 29, 1970

[21] Appl. No.: 6,702

[52] U.S. Cl. ................................74/112, 74/3.5 V, 200/38 B
[51] Int. Cl. ...................................................F16h 27/00
[58] Field of Search ..................74/3.5, 3.5 V, 3.54, 112, 1.5; 200/38 B, 38 BA, 38 C

[56] References Cited

UNITED STATES PATENTS 3,319,477  5/1967  McVicker.................................74/112
3,371,170  2/1968  Thomas et al. ..........................200/38

*Primary Examiner*—Milton Kaufman
*Attorney*—Richard H. Childress, Robert F. Meyer, Henry W. Cummings and C. Carter Ells

[57] ABSTRACT

An indexing means engages and disengages a constantly rotating energy storage means. When the energy storage means is disengaged, a motion transmission means, rotation of which is responsive to rotation of the energy storage means, intermittently drives cam programming means of a timer.

16 Claims, 7 Drawing Figures

INVENTORS
PETER ILLMAN
ARTHUR G. ROBERTS
BY Robert J Meyer
ATTORNEYS

Patented March 14, 1972
3,648,529
2 Sheets-Sheet 2
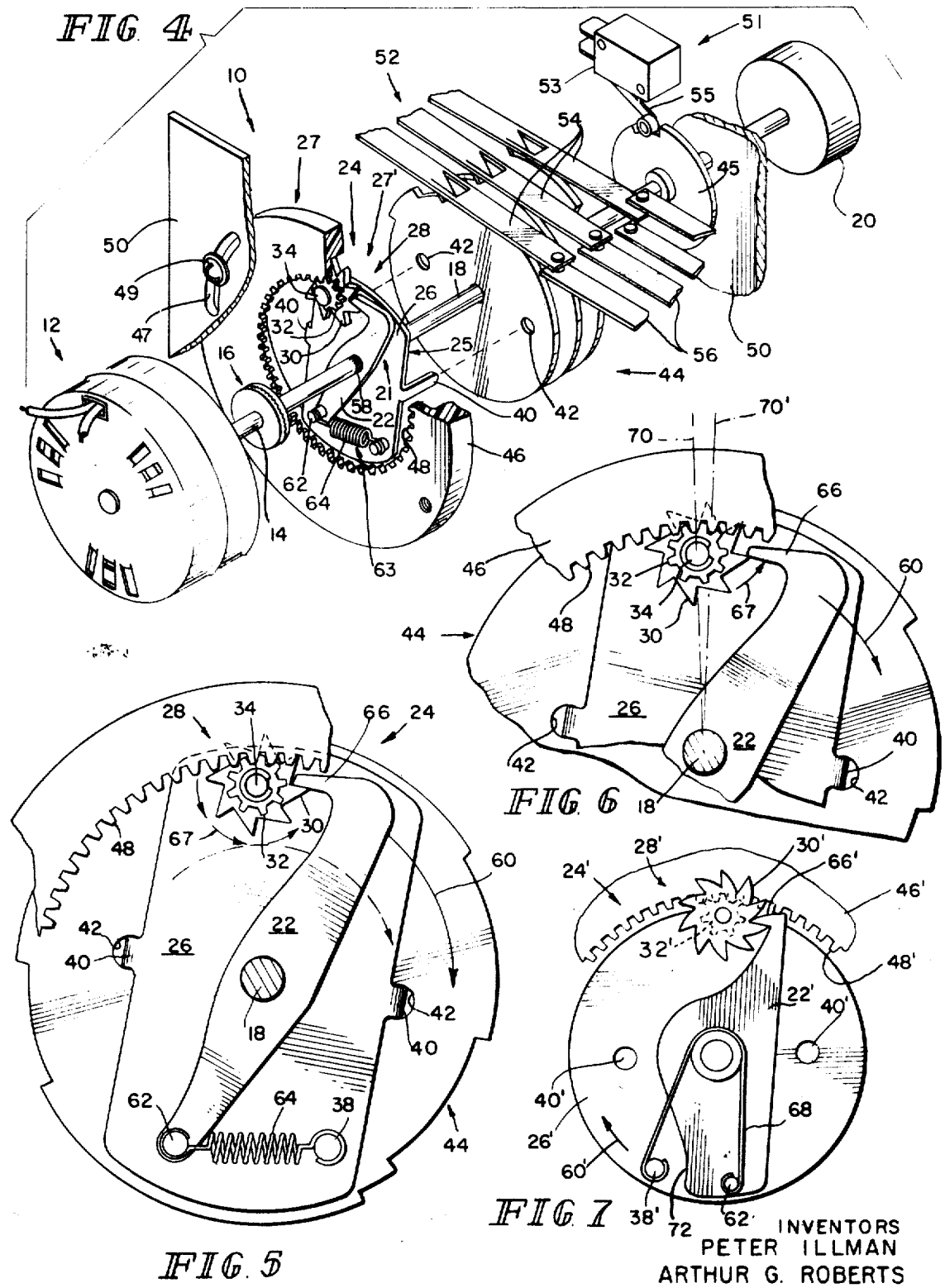
INVENTORS
PETER ILLMAN
ARTHUR G. ROBERTS
BY Robert J Meyer
ATTORNEY 3,648,529

1

INTERMITTENT MOTION TRANSMISSION

The present invention relates to a means converting a constant motion to an intermittent motion. The constant motion is rotational while the intermittent motion which constitutes the output drive, may be rotational or lineal.

In its preferred form, the present invention relates to timers and more particularly to the means for providing new and useful improvements in timers of the type having a plurality of control cams and a plurality of control switches adapted to be operated by the control cams. Specifically, the present invention deals with the escapement means of such timers.

Timers of the type having a plurality of control cams and a plurality of control switches adapted to be operated by the control cams are widely used in appliance control applications. Generally, such timers have an established program to which they are driven by an intermittent drive mechanism. An intermittent drive mechanism, sometimes referred to as an escapement, is a means for coupling the output shaft of a constant speed motor to the control cams of the timer. The purpose of the intermittent drive mechanism is to provide a periodic, snap-action rotational motion to the control cams. The snap-action rotational motion is required for fast operation of the control switches.

As appliances become more complicated, the timers required to control the appliances become larger and larger. However, the space being allowed for timers by the appliance manufacturers is not increasing and, in some cases, is decreasing. Also, timers required for control in the complicated appliances must be more accurate. Positioning of the control cams with each snap-action rotation is very critical.

The escapement mechanism of the present invention has fewer parts and occupies less space than contemporary drive mechanisms which perform similar functions and can be manufactured for less than contemporary mechanisms. Even with occupying less space and being less costly, the present escapement provides a combination of advantages in a single mechanism not heretofore available in a single escapement. Among these advantages there is included elimination of overthrow, no backup of shaft, cams cannot be manually set in mid-impulse, and has "drive through" capabilities. That is, should there be any tendency for "hang up" of the cams or the escapement, the cam carrying shaft will be driven at a constant speed until escapement again becomes operational. Additionally, the escapement provides good facilities for driving sub-interval cams.

Further, in contemporary drive mechanisms which perform similar functions, the average rate of movement of the continuously moving input member is several times that of the intermittently moving output member, the result being a loss of torque. In the present device, however, the input member rotates at the same average speed of the intermittently moving output member.

Another advantage of the present invention over that of the contemporary escapement lies in the rotational displacement of the timing cam to the rotational displacement of the drive cam of the escapement. In contemporary escapements, the drive cam would have to make a full 360° rotation (180° for two step cam) to achieve a 6° increment rotation of the timing cam stack, for example. In the present device, the timing cam stack will be rotationally displaced an increment substantially equal to the rotational increment of the drive cam.

Accordingly, it is an object of the present invention to provide a means converting a constant motion to an intermittent motion.

Another object of the invention is to provide an escapement means which is simple and economical to produce.

Another object of the invention is to provide an escapement means which has a minimum number of parts and therefore is neat and compact.

Still another object of the invention is to provide an escapement means which eliminates the problem of overthrow of the control cams.

Another object of the invention is to provide an escapement means wherein because of its construction the cam programming means of the timer using the escapement cannot be manually set in mid-impulse.

A further object of the invention is to provide an escapement means which has "drive through" capabilities.

Yet another object of the invention is to provide an escapement means which provides good facilities for driving sub-interval cams.

Still another object of the invention is to provide a means converting a constant motion to an intermittent motion wherein the input member rotates at the same average speed of the intermittently moving output member.

A further object of the invention is to provide an escapement means having an energy storage means constantly rotating about a cam carrying shaft.

Another object of the invention is to provide an escapement means wherein an indexing means intermittently engages and disengages the energy storage means of the escapement.

Yet still a further object of the invention is to provide an escapement means wherein upon disengagement of the indexing means from the energy storage means, motion transmission means intermittently drives the cam programming means in response to the release of stored energy from the energy storage means of the escapement.

Another object of the invention is to provide an escapement means having an indexing means which is an orbital indexing means.

Yet another object of the invention is to provide an escapement means wherein the orbital indexing means includes an orbiting ring of internal gear teeth and planetary stepping means engaging the internal gear teeth.

Another object of the invention is to provide an escapement which rotationally advances the timing cams an increment substantially equal to the rotational increment displacement of the drive cam or drive means.

These and other objects of the invention will become readily apparent from the following description taken in conjunction with the accompanying drawings in which:

FIG. 4 is an exploded perspective view diagrammatically showing the arrangement of a sequential timer with portions broken away for purposes of clarity;

FIGS. 5 and 6 are partial elevations illustrating different operating positions of the escapement means of the timer; and FIG. 7 is a view of another embodiment of the escapement means.

Generally speaking, the objects are accomplished by providing a means converting a constant rotational motion to an intermittent rotational motion comprising a constantly rotating shaft means, an energy storage means coupled to and constantly rotating about the shaft means, a motion transmission means carried by the shaft means and responsive to the energy storage means, an indexing means engaging the energy storage means to regulate the response of the motion transmission means to the energy storage means, rotation of the energy storage means storing energy therein, further rotation causing disengagement of the energy storage means from the indexing means thereby releasing the stored energy and further causing the motion transmission means to rotate about the shaft means, rotation of the motion transmission means causing angular and rotational displacement of the indexing means so as to reengage the indexing means with the energy storage means.

The objects of the invention are further accomplished by providing an escapement means wherein an orbital indexing means intermittently engages and disengages a constantly rotating energy storage means, disengagement of the orbital indexing means permitting a motion transmission means to rotationally index a predetermined amount in response to the release of energy from the constantly rotating energy storage means, engagement of the orbital indexing means preventing rotation of the motion transmission means and allowing energy to be stored in the constantly rotating energy storage means.

Figure 1:
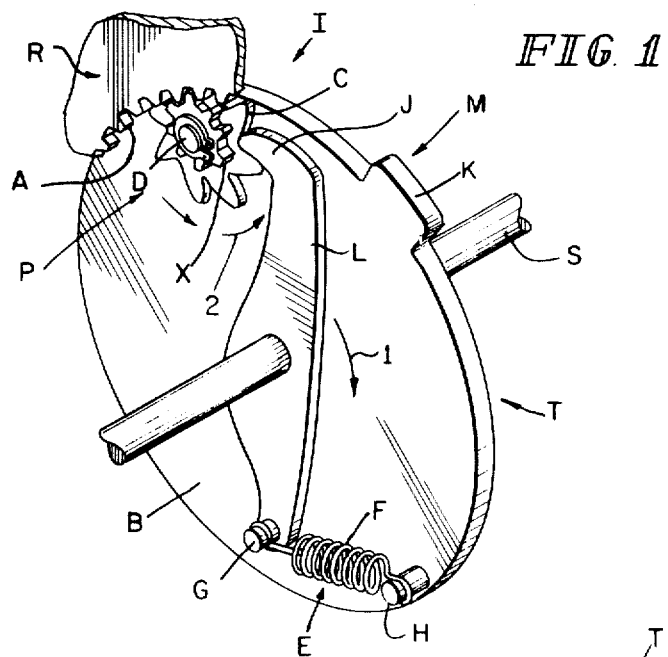
FIG. 1 is a perspective view of the motion conversion means.

Referring now to FIG. 1, there is shown a perspective view of the motion conversion means M; that is, a means converting a constant rotational motion to an intermittent motion. Such means includes a motion transmission means T, indexing means I and energy storage means E. Motion transmission means T includes a base member B carried by, but independently rotatable with respect to shaft S. Shaft S is driven at a constant speed by suitable means (not shown). Indexing means I includes a planetary stepping means P and an orbiting means R. Orbiting means R is fixedly held in a predetermined position through means (not shown). Orbiting means R includes internal gear teeth A. Planetary stepping means includes a time duration cam C and a planetary pinion X both of which are fixedly coupled together to rotate with each other about a post D which is cantilevered from base member B.

Energy storage means E includes a spring F and a drive means such as lever L. Spring F couples lever L to motion transmission means T through retaining posts G and H respectively. Lever L is fixedly coupled to shaft S. Lever L includes a dwell regulating means such as tooth J.

Base member B, as shown, includes an arcuate step K such that the base member may serve as a cam. As will be apparent hereinafter, the base member need not be a cam but could be coupled to other cams or elements to be intermittently driven.

In operation, as shaft S is rotated in the direction of arrow 1, lever L also rotates at the same constant speed as the shaft. As the lever rotates, energy is built up in spring F as the spring expands. Spring F will expand by virtue of base member B being locked from rotational movement by virtue of tooth J being engaged with time duration cam C which in turn is held from rotational movement by virtue of pinion X being engaged with interval gear teeth A. Thus base member B is locked from rotational movement so long as tooth J remains engaged with time duration cam C.

As lever L continues to rotate in the direction of arrow 1, tooth J is allowed to leave the time duration cam C at which point the stored energy in spring F will cause base member B to rotate in the direction of arrow 1. Time duration cam C will be allowed to rotate in the direction of arrow 2 and be angularly displaced as well as rotationally until the next lobe of the cam engages tooth J of lever L. The cycle is then repeated.

Since the rate of release of the cam C and its subsequent reengagement with the lever is dependent substantially directly upon the rotation rate of the lever (which in turn is dependent upon the rotational speed of the shaft), the intermittent motion of the motion transmission means is substantially directly dependent upon the rotational speed of the shaft. Thus the shaft or the input member rotates at substantially the same average speed of the intermittently moving motion transmission means or the output member. Thus in the present motion conversion means there is substantially no loss of torque.

Another distinguishing feature of the present device is that the motion transmission means T rotates an increment that is substantially equal to the individual periodic rotational displacement of the lever L. That is, if the lever L is displaced 6° before leaving the time duration cam C, then motion transmission means T will be displaced 6° at the time the lever leaves the time duration cam. This feature is particularly adaptable to escapements in sequential timer applications, as will be apparent hereinafter.

Figure 2:
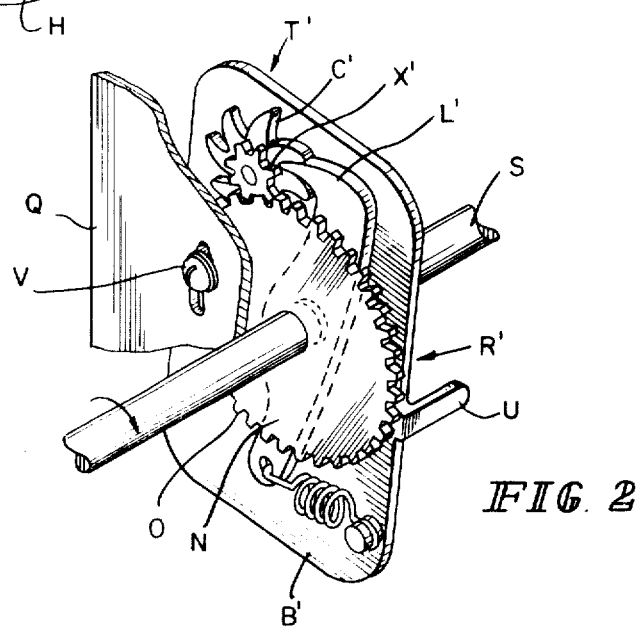
FIG. 2 is a view similar to FIG. 1 showing another embodiment of the motion conversion means.

Referring to FIG. 2, there is shown another embodiment of the invention wherein motion transmission means T' does not serve as a cam and the orbiting means R of FIG. 1 is replaced with an orbiting means R' which includes a gear N having outer teeth O in which pinion X' engages. Gear N is carried by, but independently rotatable from shaft S. Gear N is fixedly held in a predetermined position by being connected to a fixed rigid member Q through suitable means such as a nut and bolt V. It would seem clear that the operation of motion conversion means is similar to that of the motion conversion means of FIG. 1, the only difference being that time duration cam C' will rotate clockwise, that is the same direction as lever L'.

As previously noted, motion transmission means T' does not serve as a cam in the embodiment of FIG. 2. In this embodiment, motion transmission means includes base member B' having drive legs U which may be used to couple the motion transmission means to an element or elements to be driven. The operation of this embodiment will become apparent with reference to FIGS. 4-7.

Figure 3:
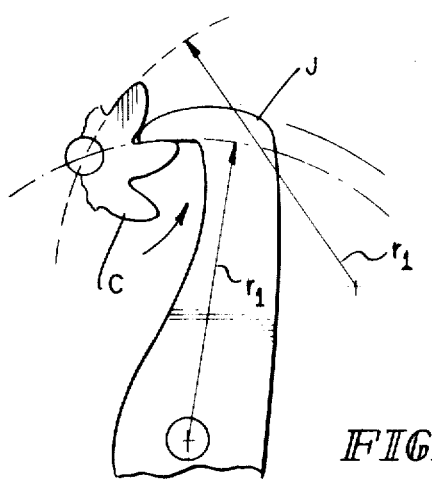
FIG. 3 is an enlarged view of two of the cooperating elements of the motion conversion means showing their relationship.

Referring to FIG. 3, there is shown the relationship between the tooth J and the time duration cam C. In order to insure that there will be no movement of time duration cam C between impulses, the shape of the tooth J should be an arc having a radius $r_1$, that is, an arc struck from the center of rotation of shaft S and passing through the center of rotation of time duration cam C.

The motion conversion means of the present invention can not be described as it would be used in an escapement of a sequential timer with reference to FIGS. 4-7. Referring now to FIGS. 4-7 and more specifically to FIG. 4, there is shown a schematic illustration of a sequential timer 10. The sequential timer 10 is provided with a drive means which includes constant speed drive motor 12 which drives an output shaft 14. Unidirectional clutch means 16 couples shaft 14 to a control shaft 18. Unidirectional clutch means 16 can be of various types, such as a spring clutch, a ratchet type clutch, a roller ramp type clutch or any similar types of one way clutch means known in the art. A control knob 20 is rigidly coupled to the control shaft 18 for manual rotation of the shaft. When manual rotation of shaft 18 is desired, shaft 18 is uncoupled from shaft 14 and thus from motor 12 by way of unidirectional clutch means 16. A cam programming means and an escapement means 24 are carried by control shaft 18. The cam programming means includes a cam stack 44.

Escapement means 24 includes motion transmission means 25, indexing means 27 and energy storage means 63. Motion transmission means 25 includes a base member 26. Indexing means 27 includes an orbiting means 27' which includes a planetary stepping means 28 and orbiting ring 46. Planetary stepping means 28 includes a time duration cam 30 and a planetary pinion 32. Both the planetary pinion 32 and the time duration cam 30 are fixedly coupled together to rotate with each other about a cantilevered post 34 which is coupled to the base member 26. Base member 26 is independently rotatably carried by control shaft 18. Planetary stepping means 28 is axially retained on post 34. Orbiting ring 46 is coupled to the housing 50 of the timer through suitable means such as bolt 49, the ring being radially adjustable through slot 47. The orbiting ring 46 includes internal gear teeth 48.

Energy storage means 63 includes a spring 64 and drive means 21. Spring 64 couples drive means 21 to motion transmission means 25 through retaining posts 62 and 38 respectively. Drive means 21 includes a drive lever 22 having a dwell regulating means such as tooth 66, the lever being fixedly coupled to control shaft 18 through splines 58.

Base member 26 is coupled to cam stack 44 through suitable means such as legs 40 which engage openings 42. Base member 26 could, if desired, take the form of a cam and be included as part of cam stack 44.

Carried by the housing 50 is a plurality of switching means 52 which includes a series of movable blades 54 which cooperate with their respective stationary contact blades 56. The movable contact blades 54 are responsive to the valleys and peaks of the cam tracks on the cam stack 44.

The operation of the escapement means 24 in connection with the drive motor 12 and cam stack 44 will become more apparent in connection with FIGS. 4 through 6. Referring to FIGS. 4-6, the drive motor 12 drives the output shaft 14 at a constant rate of speed. This drive force is directed through the shaft 18 by way of unidirectional clutch means 16 to drive lever 22 which as previously noted, is fixedly coupled to the shaft 18 by way of spline 58. As shaft 18 is rotated, the drive lever 22 is also rotated at a constant speed in the direction of the arrow 60 shown in FIGS. 5 and 6. As lever 22 rotates, energy is built up in spring 64 by the post 62 on the lever 22 constantly being moved away from the post 38 so as to expand the spring. Post 38 is restrained from movement by virtue of tooth 66 of lever 22 being engaged with time duration cam 30 which in turn is held from rotational movement by virtue of pinion 32 being in engagement with internal gear teeth 48. Thus base member 26 is locked from rotational movement so long as tooth 66 remains engaged with time duration cam 30.

It can be seen that as drive lever 22 continues to rotate in the direction of arrow 60, tooth 66 is allowed to leave the time duration cam 30. As tooth 66 is released from cam 30, the stored energy in spring 64 will cause base member 26 to rotate in the direction of arrow 60. Cam 30 will be allowed to rotate in a counterclockwise rotational movement (arrow 67) as shown in FIGS. 5 and 6. As shown in FIG. 6, the arrow 67 indicates the actual path of movement that the tip of cam 30 will take to assume a position similar to FIG. 5 with the center of post 34 moving from dotted line 70 to 70'. The angular displacement of the planetary stepping means 28 is indicated by the dotted lines 70 and 70' to show its angular displacement as it moves from one escapement time to the next or from releasing time to stopping time. The releasing of the planetary stepping means 28 is a result of the tooth 66 of the drive lever 22 leaving the cam 30 thereby allowing it to rotate. It is seen that the stopping of the time duration cam 30 is a result of the next lobe on the cam 30 coming into interference abutment with the tooth 66. As the cam 30 moves into abutment with the tooth 66, the rotation of planetary stepping means 38 is prevented from rotating beyond that stopping point and at the same time it will stop the angular displacement of post 34 and base member 26. Overthrow of cam stack 44 is thus prevented. And perhaps more importantly, the motion transmission means has rotated an increment substantially equal to the incremental rotational displacement of drive lever 22. Or, as a corollary, the lever 22 is rotationally displaced an increment substantially equal to the rotational increment of the motion transmission means. This is a substantial departure from prior art escapements wherein a cam may rotate 360° in order to advance a cam stack an increment of 6°, for example. In the present invention the movement of the motion transmission means has rotated an increment substantially equal to the rotational increment of the lever 22, with the motion transmission means rotating cam stack 44 substantially the same increment.

The present structure, wherein the time duration cam 30 moves into engagement with tooth 66 as opposed to the tooth 66 moving into engagement with cam 30 gives another advantage over prior art escapements. Thus in prior art escapements where the tooth moves into engagement with the cam, the timing cams are manually set by rotating the timing cams through a clutch. With this arrangement, the timing cams can be set between a programmed cycle. In the present arrangement, where the tooth engages the cam 30, the cam stack 44 is manually set by rotation of the stack through the escapement. Thus the possibility of the cams being set in the middle of a cycle interval is substantially eliminated.

Referring now to FIG. 7, there is shown another embodiment similar to the embodiments in FIGS. 4-6 wherein a planetary pinion 32' is receivably carried in an orbiting ring 46' and is constantly in mesh with an internal gear 48'. It can be seen that a different type of cam configuration is used for the time duration cam 30' to give a rolled down effect of the tooth 66'. It can also be seen that the number of cam lobes have been varied so as to provide a different angular displacement of the planetary stepping means 28'.

Another variation in FIG. 7 is shown in the energy storing means. The energy storing means 63' in FIG. 7 utilizes a leaf spring or torsion spring which is anchored at one end to a post 62' on the drive lever 22' and its opposite end to a post 38' on the base member 26'. In this embodiment, should there be a "hang-up" in the timer due to, for example, a frictional drag or some other malfunction, the post 38' lies in a direct interference path with a portion 72 on the first end of the drive lever 22' so that as the drive lever 22' continues to rotate in the direction of the arrow 60' the portion 72 on the drive lever 22' will directly drive the post 38' which in turn is coupled to the base member 26' thereby positively driving it to free any frictional "hang-up." From that point on the escapement means 24' will continue to operate in its normal fashion.

Returning to FIG. 4, since the control shaft 18 is being driven at a constant speed, one or more sub-interval means 51 could, if desired, be included in a timer utilizing the escapement means of the present invention. Such sub-interval means 51 would include at least one sub-interval cam 45 connected to control shaft 18 so as to rotate in accordance with the rotation of the shaft and at least one switch means 53 responsive to the cam 45 through follower arm 55. The sub-interval would provide a switching duration shorter than that of the escapement means 24.

Thus there is described a novel escapement means which is simple, and economical to produce and which by its structure substantially eliminates backlash and overthrow, operates without a loss in torque, permits the driving means to rotationally advance an increment substantially equal in magnitude of the advance of the cam programming means, cannot be manually set at mid-impulse and, in addition, sub-interval means can easily be provided for the timer in which it is used.

What is claimed is:

1. In an escapement for a sequential timer wherein a cam programming means is rotationally indexed about a cam carrying shaft to open and close electrical switch means, an orbital indexing means intermittently engaging and disengaging a constantly rotating energy storage means, disengagement of said orbital indexing means releasing energy stored in said energy storage means and permitting a motion transmission means to rotationally index a predetermined amount in response to the rotation of said constantly rotating energy storage means, engagement of said orbital indexing means preventing rotation of said motion transmission means in response to the rotation of said energy storage means to allow energy to be stored in said energy storage means, rotation of said cam programming means responsive to rotation of said rotational indexing of said motion transmission means.

2. In an escapement for a sequential timer according to claim 1 wherein said orbital indexing means includes an orbiting ring substantially surrounding said cam carrying shaft, and a planetary stepping means coupled to said motion transmission means and engaging said orbiting ring, said planetary stepping means intermittently engaging and disengaging said energy storage means.

3. In an escapement for a sequential timer according to claim 2 wherein said orbiting ring includes internal gear teeth, and said planetary stepping means includes a pinion meshing with said internal gear and a cam, both rotatably coupled to said motion transmission means, said cam intermittently engaging and disengaging said energy storage means.

4. In an escapement for a sequential timer according to claim 1 wherein said motion transmission means includes a substantially flat base member independently rotatably carried by said cam carrying shaft, and means coupling said substantially flat base member to said cam programming means.

5. In an escapement for a sequential timer according to claim 1 wherein said energy storage means includes a drive lever fixedly coupled to said cam carrying shaft and a spring coupling said lever to said motion transmission means, said drive lever including a dwell regulating means engaging said orbital indexing means.

6. In an escapement for a sequential timer according to claim 5 wherein said spring is a coil spring, the coil portion of which surrounds said cam carrying shaft.

7. An escapement means for intermittently advancing a cam programming means of a sequential timer comprising:

a. a drive means fixedly coupled to a constantly driven shaft carrying said cam programming means,
b. a motion transmission means independently rotatably carried by said cam carrying shaft,
c. means coupling said motion transmission means to said cam programming means,
d. spring means coupling said drive means to said motion transmission means,
e. an orbiting ring substantially surrounding said cam carrying shaft, said orbiting ring including an internal gear, and
f. planetary stepping means rotatably carried by said motion transmission means, said planetary stepping means meshing with said internal gear and intermittently engaging and disengaging said drive means.

8. An escapement means according to claim 7 wherein said planetary stepping means includes a pinion meshing with said internal gear and a cam intermittently engaging and disengaging said drive means.

9. An escapement means according to claim 7 wherein said motion transmission means is a substantially flat base member, and said means coupling said motion transmission means to said programming means includes legs extending from said base member through apertures disposed in said cam programming means.

10. An escapement means according to claim 7 wherein said spring is a coil spring, the coil portion of which surrounds said cam carrying shaft.

11. A sequential timer comprising:
a. motor drive means,
b. shaft means coupled to said drive means, said shaft means including an output shaft and a control shaft, and clutch means coupling said output shaft to said control shaft,
c. cam programming means independently rotatably carried by said control shaft,
d. an escapement means coupled to said control shaft, including means coupling said escapement means to said cam programming means, energy storage means coupled to and rotating with said control shaft, and
e. manual drive means coupled to said control shaft.

12. A sequential timer according to claim 11 wherein said timer further includes a sub-interval cam coupled to said control shaft and switch means responsive to said sub-interval cam.

13. Means converting a constant rotational motion to an intermittent rotational motion comprising:
a constantly rotating shaft means,
an energy storage means coupled to and constantly rotating with said shaft means,
a motion transmission means carried by said shaft means and rotation thereof responsive to rotation of said energy storage means,
an indexing means engaging said energy storage means to regulate the response of said motion transmission means to rotation of said energy storage means,
rotation of said energy storage means storing energy therein, further rotation causing disengagement of said energy storage means from said indexing means thereby releasing said stored energy and further causing said motion transmission means to rotate about said shaft means, rotation of said motion transmission means causing angular and rotational displacement of said indexing means so as to reengage said indexing means with said energy storage means.

14. In an intermittent drive mechanism for intermittently advancing a cam programming means carried by a rotatable shaft;
a motion transmission means carried by said shaft and coupled to said cam programming means,
and energy storage means intermittently rotationally advancing said motion transmission means, said energy storage means including a lever means coupled to said shaft and a spring means coupling said lever means to said motion transmission means, said spring means orbiting about said shaft.

15. In an intermittent drive mechanism for intermittently advancing a cam programming means carried by a shaft, an energy storage means coupled to and constantly rotating with said shaft, said energy storage means including a spring means orbiting about said shaft, rotation of said cam programming means responsive to rotation of a motion transmission means carried by said shaft and responsive to rotation of said energy storage means, and indexing means regulating the response of said motion transmission means to said energy storage means.

16. In an intermittent drive mechanism for intermittently advancing a cam programming means carried by a shaft, an energy storage means coupled to and constantly rotating with said shaft, rotation of said cam programming means responsive to rotation of said energy storage means, an indexing means regulating the response of said motion transmission means to rotation of said energy storage means, rotation of said energy storage means storing energy therein, further rotation causing disengagement of said energy storage means from said indexing means thereby releasing said stored energy and causing said motion transmission means to rotate about said shaft, rotation of said motion transmission means causing angular and rotational displacement of said indexing means so to to reengage said indexing means with said energy storage means.

* * * * *